(12) United States Patent
Thiel et al.

(10) Patent No.: US 7,458,639 B2
(45) Date of Patent: Dec. 2, 2008

(54) FITTING FOR A VEHICLE SEAT

(75) Inventors: Peter Thiel, Remscheid (DE); Andreas Vedder, Haan (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 7 days.

(21) Appl. No.: 11/786,937

(22) Filed: Apr. 13, 2007

(65) Prior Publication Data

US 2007/0241602 A1    Oct. 18, 2007

Related U.S. Application Data

(63) Continuation of application No. PCT/EP2005/010824, filed on Oct. 7, 2005.

(30) Foreign Application Priority Data

Oct. 14, 2004    (DE) .................... 10 2004 049 991

(51) Int. Cl.
*B60N 2/02* (2006.01)
(52) U.S. Cl. ...................................... 297/367
(58) Field of Classification Search ................. 297/367, 297/369
See application file for complete search history.

(56) References Cited

U.S. PATENT DOCUMENTS

| 5,188,571 | A | 2/1993 | Boltze et al. |
| 5,536,217 | A | 7/1996 | Droulon et al. |
| 5,611,599 | A | 3/1997 | Baloche et al. |
| 5,634,689 | A | 6/1997 | Putsch et al. |
| 5,755,491 | A | 5/1998 | Baloche et al. |
| 5,997,090 | A | 12/1999 | Baloche et al. |
| 6,164,723 | A | 12/2000 | Ganot |
| 6,318,806 | B1 * | 11/2001 | Levert et al. ............... 297/367 |
| 6,332,649 | B1 | 12/2001 | Vossmann |
| 6,454,354 | B1 | 9/2002 | Vossmann et al. |
| 2003/0214165 | A1 | 11/2003 | Finner et al. |

FOREIGN PATENT DOCUMENTS

| DE | 31 29 672 C1 | 10/1982 |
| DE | 44 00 911 A1 | 8/1994 |
| FR | 2 690 880 A1 | 11/1993 |
| GB | 2 197 830 A | 6/1988 |

\* cited by examiner

*Primary Examiner*—Joseph F Edell
(74) *Attorney, Agent, or Firm*—Womble Carlyle Sandridge & Rice, PLLC

(57) ABSTRACT

In a fitting (5) for a vehicle seat, in particular for a motor vehicle seat, having two by themselves fully functional, adjacent single fittings (11, 20) defining two parallel axes (A, B), the single fittings (11, 20) are substantially axially aligned with respect to each other along the common first axis (A).

20 Claims, 5 Drawing Sheets

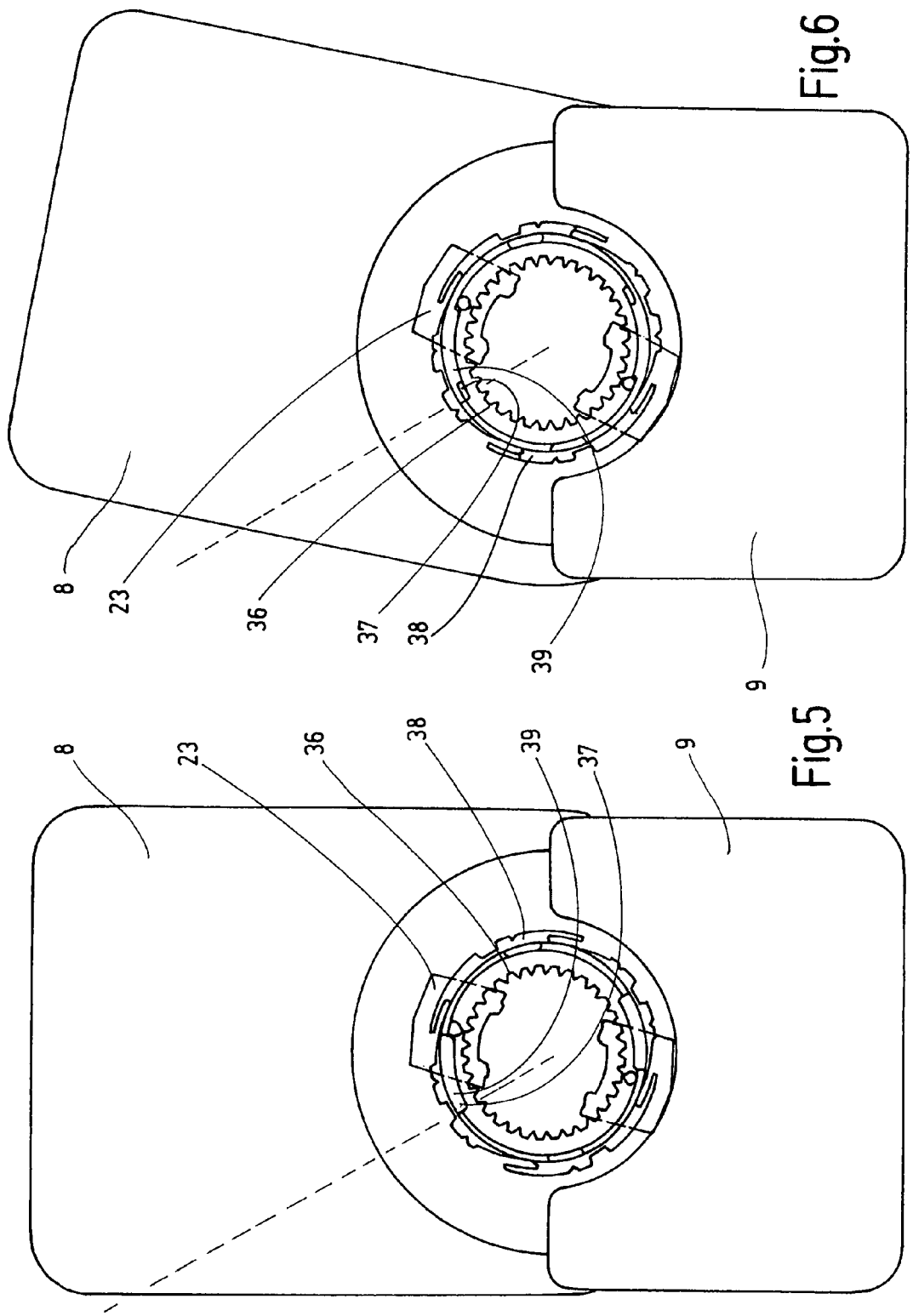

FITTING FOR A VEHICLE SEAT

CROSS-REFERENCE TO RELATED APPLICATION

The present application is a continuation of International Application PCT/EP2005/010824, which was filed Oct. 7, 2005. The entire disclosure of PCT/EP2005/010824 is incorporated herein by reference.

BACKGROUND OF THE INVENTION

The present invention relates to a fitting for a vehicle seat, in particular for a motor vehicle seat, with the fitting comprising two fittings that define two parallel axes.

In a fitting of this type known from U.S. Pat. No. 5,997,090, which discloses that two detent fittings are arranged radially offset from each other with respect to the axes. A common first fitting part is provided which has guides for the respective locking elements, while the second fitting parts are independent of each other and are mounted, on the one hand, on the seat part, and, on the other hand, on the backrest of a vehicle seat.

BRIEF SUMMARY OF SOME ASPECTS OF THE INVENTION

On aspect of the present invention is the provision of improvements with respect to a fitting that comprises two fittings.

In accordance with one aspect of the present invention, a compound fitting for a vehicle seat, in particular for a motor vehicle seat, is adjustable about a first axis, with the compounding fitting including a first fitting and a second fitting. The first fitting is for adjusting the compound fitting about the first axis, and the first fitting has a second axis that is parallel to the first axis. The second fitting is also for adjusting the compound fitting about the first axis. The first and second fittings are mounted so that they are substantially axially aligned with respect to one another along the first axis.

Because the first fitting and a second fitting (e.g., single fittings) are substantially axially aligned with respect to each other along the common first axis, the radial installation space required is reduced, as a result of which there is, for example, space available for the installation of a side airbag above the compound fitting in a vehicle seat. The compound fitting is used preferably in the backrest of the vehicle seat in order to bring the backrest into several use positions and at least one non-use position, but other applications are also conceivable. Preferably a geared fitting and a detent fitting are provided as the single fittings, and they preferably have a disc-shaped configuration. The geared fitting, which for example is designed as an eccentric planetary gear system, constitutes by itself an inclination adjuster that allows the backrest to be moved into several use positions. Thanks to the design of the geared fitting, stepless transition is possible between the use positions, which are secured by the self-locking action of the geared fitting. The detent fitting, which is preferably provided with radially movable locking elements, is also an inclination adjuster, but in the present case it is used merely as a tilt fitting that enables the backrest to be moved from an adjusted use position into the non-use positions.

Both single fittings each comprise preferably a first and a second fitting part. The first fitting parts are, for example, provided with projections, while the second fitting parts are designed as internal gears. The second geared fitting part and the second detent fitting part are preferably at least rotationally fixedly connected to each other and correspondingly arranged in direct axial adjacency to each other, although other arrangements and connections (e.g. welding) are also conceivable.

In a preferred embodiment, a control device is provided that controls the locking of the detent fitting as a function of the angular positions of the fitting parts relative to each other, in particular limiting the locking to certain use and non-use positions when the compound fitting is used for the backrest of a vehicle seat. The control device preferably comprises means, for example a slot-and-pin guide or a planetary gear, to compensate for a wobble motion of the geared fitting. In this regard, the control device preferably comprises rings which cooperate with the locking elements provided on the detent fitting by way of control cams, i.e. the rings limit the radial mobility, one ring being held in constant angular position relative to the first geared fitting part of the compound fitting by the means used to balance out the wobble motion and thus not taking part in the wobble motion, while a further ring remains in constant angular position relative to the second geared fitting part and thus to the detent fitting.

The control device may become dispensable if a frictional securing of the non-use positions is sufficient. For this purpose, for example, an extension bushing connected to the second detent fitting part is provided, with the bushing being used to attach a dead-center spring which, at its other end, is connected to the first detent fitting part and in each case supports the transition into the end positions of a pivoting motion and which comprises a dead-center position in-between.

In the compound fitting according to one embodiment of the invention, a common enclosing ring that encloses and/or claps the single fittings or some other common housing is preferably provided. It is, however, also possible for each single fitting to have its own partially enclosing rings or partially enclosing segments which in each case enclose and/or clasp the single fittings associated with them.

Other aspects and advantages of the present invention will become apparent from the following.

BRIEF DESCRIPTION OF THE DRAWINGS

The invention is described in detail below with reference to an exemplary embodiment shown in the drawings, with the exemplary embodiment having four modifications. In the drawings:

FIG. 5 is a view of some components in the forwardmost use position.

FIG. 6 is a view corresponding to FIG. 5 in a use position further inclined to the rear.

DETAILED DESCRIPTION OF EXEMPLARY EMBODIMENT

Figure 1:
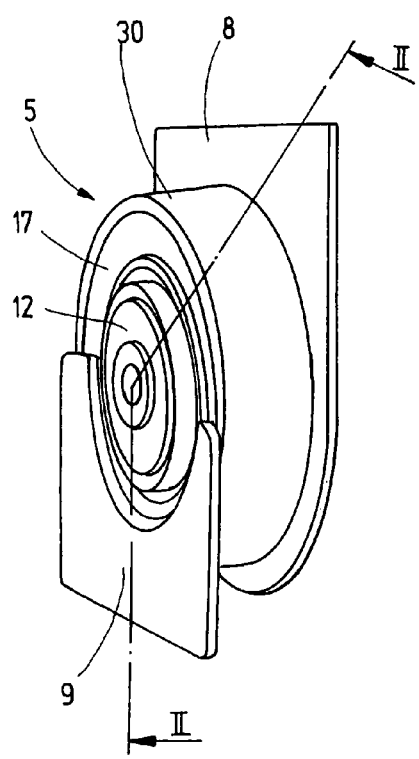
FIG. 1 is a perspective view of the exemplary embodiment.
Figure 2:
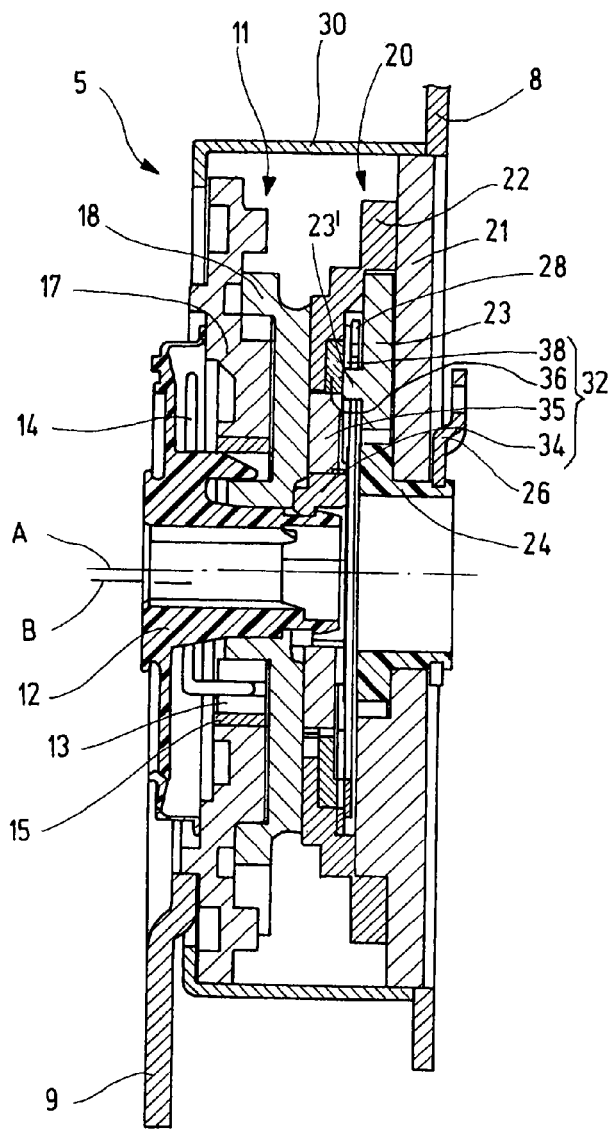
FIG. 2 is a cross-section through the exemplary embodiment, with the cross section taken along the line II-II in FIG. 1.
Figure 3:
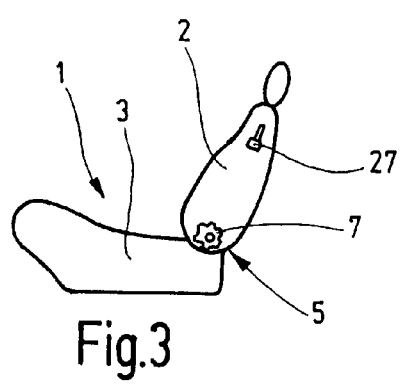
FIG. 3 is a schematic depiction of a vehicle seat.
Figure 4:
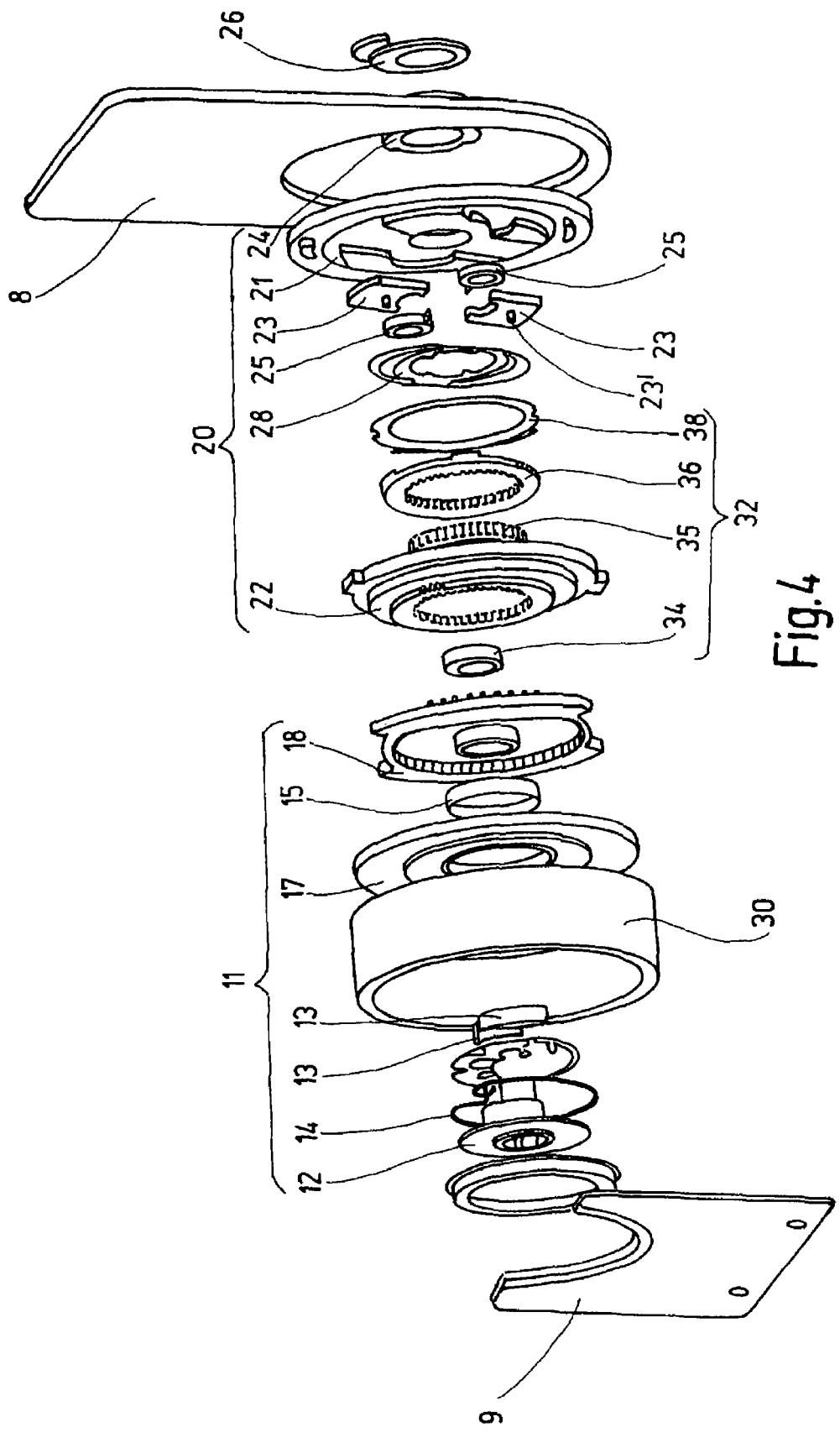
FIG. 4 is an exploded view of the exemplary embodiment.

In a vehicle seat 1, the backrest 2 can be steplessly adjusted in its inclination relative to the seat part 3 in various use positions that are suitable for the purpose of sitting in the vehicle seat. In addition, depending on the use situation, the backrest 2 may be pivoted so that the vehicle seat 1 assumes at least one non-use position that is not suitable for the purpose of sitting in the vehicle seat. For example, the backrest 2 may be freely pivoted forward (i.e. into a position permitting entry into the vehicle) or it may be pivoted, also in a forward direction, into an approximately horizontal table position, or it may be pivoted to the rear into a reclining position. For this purpose, the backrest 2 is attached on both sides to the seat part 3, in each case by way of a fitting 5 (e.g., a compound fitting).

The two fittings 5 are arranged in mirror-inverted relationship and among other things are connected with each other by way of a horizontally oriented, profiled transmission rod in a manner described further below. The transmission rod defines a first axis A assigned to the backrest 2. The first axis A at the same time constitutes the pivoting axis for the backrest 2 when it is pivoted free or when it is pivoted into the table or reclining positions. In addition, the first axis A defines the directional data which are used this description. At one side of the vehicle seat 1, a handwheel 7 is mounted on the transmission rod that defines the first axis A. The transmission rod can be rotated about the first axis A by way of the handwheel 7.

Each fitting 5 (e.g., each compound fitting) comprises an upper fitting part 8 connected to the backrest 2 and a lower fitting part 9 connected to the seat part 3. For each fitting 5, between its lower fitting part 9 and the upper fitting part 8, the fitting 5 first comprises in the axial direction (i.e. in the direction of the first axis A) functional parts of a known type of geared fitting 11 that is fully functional as a single fitting and that is designed as an eccentric planetary gear system.

A first driver 12, which rotates about the first axis A, comprises an integrally formed driver segment that engages with play between the narrow sides of two wedge segments 13 that are supported by way of their curved inner surfaces on the first driver 12. The mutually facing broad ends of the wedge segments 13 each have a recess defined by projecting material parts, with each of these recesses accepting an end section, which is bent in the axial direction, of an annular spring 14 that forces the wedge segments 13 apart in the circumferential direction. The first driver 12 with its driver segment and the wedge segments 13 defines an eccentric.

The curved outer sides of the wedge segments 13 and of the driver segment slide in a sliding bearing bushing 15 that is pressed into a first geared fitting part 17. The first geared fitting part 17 is approximately disc-shaped and is provided with a profiled externally toothed gear wheel. Radially inwards, the first driver 12 bears against an integrally formed disc and an elastic sealing lip on the side of the first geared fitting part 17 facing away from the gear wheel, while radially further outwards the lower fitting part 9 is connected to the first geared fitting part 17. The first driver 12 is supported on a collar of a second geared fitting part 18 positioned on the first axis A. The second geared fitting part 18 is designed as a hollow gear wheel and is provided with a gear rim defining an internal toothing which has a diameter larger by at least one tooth height and a number of teeth higher by at least one relative to the gear wheel.

Rotation of the first driver 12 around the first axis A results in a rolling motion between the gear wheel and the gear rim which manifests itself as a relative rotation of the first geared fitting part 17 and the second geared fitting part 18, with a superimposed wobble motion. Because of its mounting, the first driver 12 also wobbles, so that the first axis A changes its position. On the other hand, the lower fitting part 9, which is firmly attached to the seat part, and the first geared fitting part 17, the gear wheel of which defines a stationary second axis B being parallel to the first axis A, stay stationary.

Adjoining the geared fitting 11 in the axial direction, and adjacently offset thereto, the fitting 5 comprises functional parts of a known type of detent fitting 20 which is fully functional as a single fitting. On the upper fitting part 8 there is attached a disc-shaped first detent fitting part 21 aligned with the first axis A and having projecting guide and bearing segments on the side facing the geared fitting part 11. On the one hand, the bearing segments of the first detent fitting part 21 bear a similarly disc-shaped second detent fitting part 22. On the other hand, the bearing segments of the first detent fitting part 21 guide two toothed, flat locking elements 23 in a radial direction. Each locking element 23 comprises a lug 23', which in the present case is formed on the locking element 23 and projects parallel to the axis A.

A second driver 24, which is provided with eccentric cams, is mounted in the first detent fitting part 21 and rotatable about the first axis A. The second driver 24 is pretensioned by springs 25 and forces the locking elements 23 radially outward where they cooperate with the second detent fitting part 22 which has the form of a hollow gear wheel, in order to lock the detent fitting 20. An actuating ring 26, which is mounted in a rotationally fixed manner on the second driver 24 on the side of the first detent fitting part 21 facing away from the geared fitting 11, is cooperatively connected with an actuating lever 27 provided at the side of the backrest 2. A torque is applied by the lever 27 to the actuating ring 26 so that the second driver 24 can be rotated against the pretensioning of the springs 25. When such rotation occurs, the guide slots of a control disc 28 mounted on the second driver 24 pull the locking elements 23 by means of their lugs 23' radially inwards so that the detent fitting 20 is unlocked. The first detent fitting part 21 can then be rotated relative to the second detent fitting part 22 around the first axis A. When force is no longer applied to the actuating ring 26, the springs 25 ensure that the detent fitting 20 is locked once more.

The second detent fitting part 22 is connected in a rotationally fixed manner, for example, welded, to the second geared fitting part 18 that faces it. A hoop-like enclosing ring 30, which is connected, in particular welded, to the first detent fitting part 21 and/or the upper fitting part 8, and which is aligned with the first axis A, encloses the functional parts of the geared fitting 11 and of the detent fitting 20 on the radial outer side. Thus it encloses the first geared fitting part 17 with enough radial play for the wobble motion to take place unhindered.

A control device 32 is provided in order to restrict the locking of the detent fitting 20 to certain angular ranges or positions, i.e. the use positions, entry position, table position, reclining position, or to allow the locking to take place only at these angular settings. The control device 32 comprises an eccentric bushing 34 which is mounted in a rotationally fixed manner on the first driver 12, with the eccentricity of the eccentric bushing 34 being radially opposed to the eccentricity of the wedge segments 13. A pinion 35 is slidingly mounted on the eccentric bushing 34 and meshes not only with inner toothing formed on the second detent fitting part 22 but also with a toothed ring 36, thereby forming a planetary gear system. The tooth counts of the two last-mentioned toothings correspond to those of the geared fitting 11. The toothed ring 36 rotatably mounted in the second detent fitting part 22 comprises a first control cam 37 (FIGS. 5 and 6) at each of two oppositely arranged points, with these cams 37 running in each case in the circumferential direction and projecting radially inwards. A control ring 38 is mounted in a rotationally fixed manner in the second detent fitting part 22 and axially offset relative to the toothed ring 36 by the thickness of the material. The control ring 38 comprises a second control cam 39 (FIGS. 5 and 6) at each of two oppositely arranged points, with the control cams 39 running in each case in the circumferential direction and projecting radially inwards.

When the first driver 12 rotates, the planetary gearing in the control device 32 compensates for the wobble motion of the geared fitting 11. When the backrest 2 is inclined, the toothed ring 36 is as a result held at a constant angular setting relative to the first geared fitting part 17 (and thus to lower fitting part 9 and to the seat part 3), while the control ring 38 follows the second geared fitting part 18 (and ultimately the backrest 2). The situation is illustrated in FIGS. 5 and 6 (the direction of travel is to the left), which show the forwardmost use position (backrest 2 upright) and the use position following a rotation of the first driver 12 (backrest 2 inclined slightly to the rear).

The control cams 37 and 39 act cooperatively with the lugs 23' of the locking elements 23, in the present case defining the areas of non-engagement in that, when the backrest 2 or the upper fitting part 8 is pivoted, the lugs 23' of the locking elements 23, which are co-rotating around the first axis A, are pushed radially inwards by the control cams 37 and 39 and thus prevent the detent fitting 20 from becoming locked. The first control cams 37 are relevant for locking the fitting in a defined non-use position (with the end of the cam located further in the counterclockwise direction in FIGS. 5 and 6), while the second control cams 39 control the engagement in the use positions (with the end of the cam located further in the clockwise direction). In FIG. 5 the pairs of control cams 37 and 39 are congruent, while in FIG. 6 the control ring 38 (with the backrest 2) is pivoted slightly to the rear relative to the toothed ring 36. On the other hand, the entry position (as a defined non-use position), which is indicated by a dashed line, remains at a constant angular position relative to the seat part 3.

Figure 7:
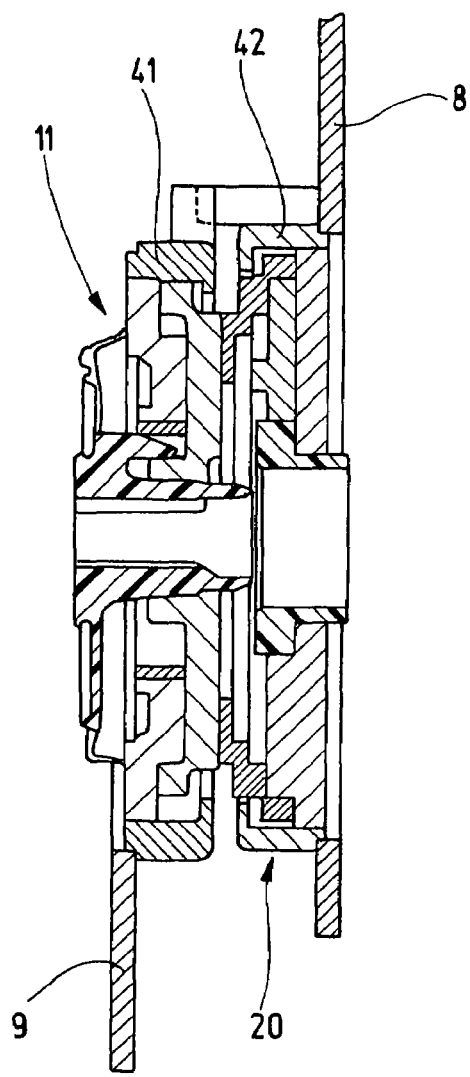
FIG. 7 is a view corresponding to FIG. 2 of a first modification of the exemplary embodiment, with some components omitted.

A first modification of the exemplary embodiment is almost identical in construction to the exemplary embodiment; therefore, identical components have the same reference numbers. In accordance with the first modification, instead of the common enclosing ring 30, a first partially enclosing ring 41 is provided for the geared fitting 11 and a second partially enclosing ring 42 is provided for the detent fitting 20. Each of the partially enclosing rings 41, 42 is separately formed, and they are arranged adjacent to one another in the axial direction, and independently of each other they enclose the functional parts which are associated with them. The partially enclosing rings 41 and 42 need not form a full circle and each may be formed with several segments. As indicated in FIG. 7, in order to limit the freely pivoting, cooperating stops may be provided on the partially enclosing rings 41 and 42.

Figure 8:
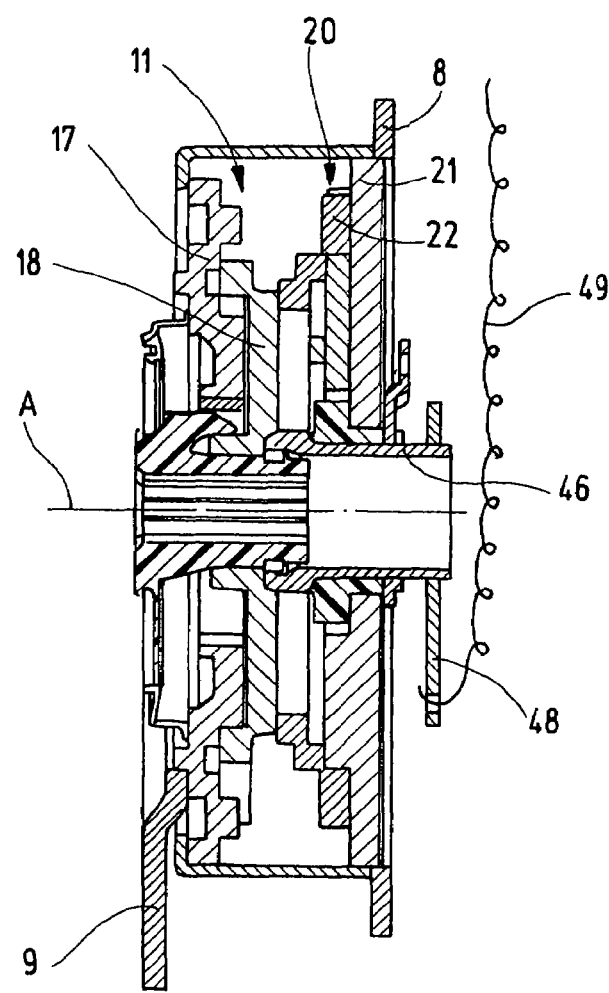
FIG. 8 is a view corresponding to FIG. 2 of a second modification of the exemplary embodiment, with some components omitted.
Figure 9:
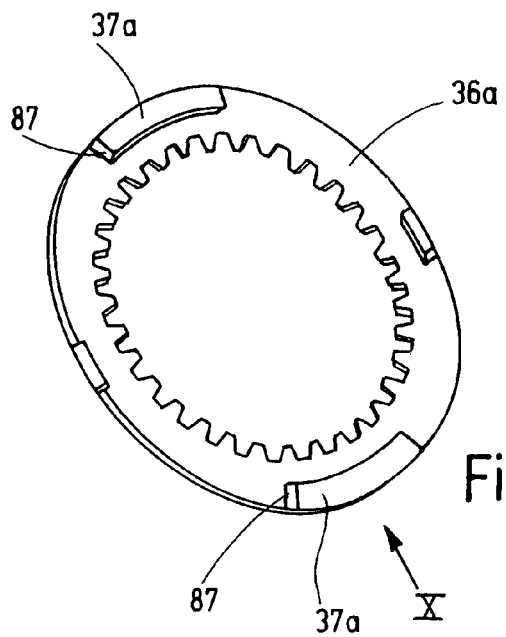
FIG. 9 is a perspective view of a toothed ring according to a third modification of the exemplary embodiment.

A second modification of the exemplary embodiment is, again, almost identical in construction to the exemplary embodiment; therefore, identical components bear the same reference numbers, insofar as they are depicted in FIG. 8. In accordance with the second modification, a connecting bushing 46 is mounted on the second geared fitting part 18 (or alternatively directly on the second detent fitting part 22 which is connected thereto). The connecting bushing 46 passes with radial spacing (air) (e.g., a gap) through the second driver 24 carrying at its free end an attachment bracket 48. A dead-centre spring 49 may be attached to this attachment bracket 48, with its other end being attached to the backrest 2, i.e. being connected with the first detent fitting part 21. The dead-centre spring 49 is maximally pretensioned when the backrest 2 is positioned between the use position and the entry position, at which point its line of action intersects the axis A. When the backrest 2 is in the other positions, the dead-centre spring 49 supports the transition into the use position or the entry position, and it can secure the entry position by frictional force. The control device 32 provided to lock the entry position by way of the detent fitting 20 can therefore be dispensed with.

The control device 32 can also be omitted in the exemplary embodiment itself and in the first modification if securing of the entry position is not desired.

Two further modifications of the exemplary embodiment are provided for those cases in which securing of the entry position is desired so that it is additionally protected against misuse. For example, in the entry position there might be a risk that the geared fitting II is misused to adjust the inclination setting. The toothed ring 36 would then remain in a constant angular setting in relation to the first geared fitting part 17, while the lugs 23' of the locking elements 23 would undergo a change in angle which, because the lugs 23' bear against the first control cams 37, and depending on the angular position of the geared fitting 11, would result in a heavy stress load on and possibly damage to the lugs 23' or the first control cams 37.

Figure 10:
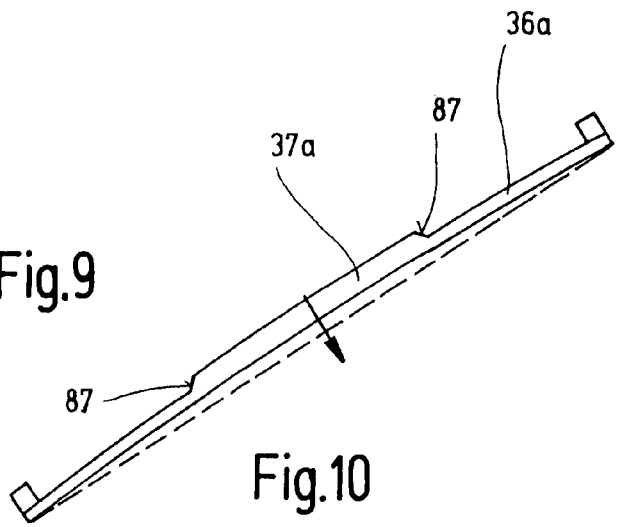
FIG. 10 is a lateral view of the toothed ring in the direction of the arrow X in FIG. 9.
Figure 11:
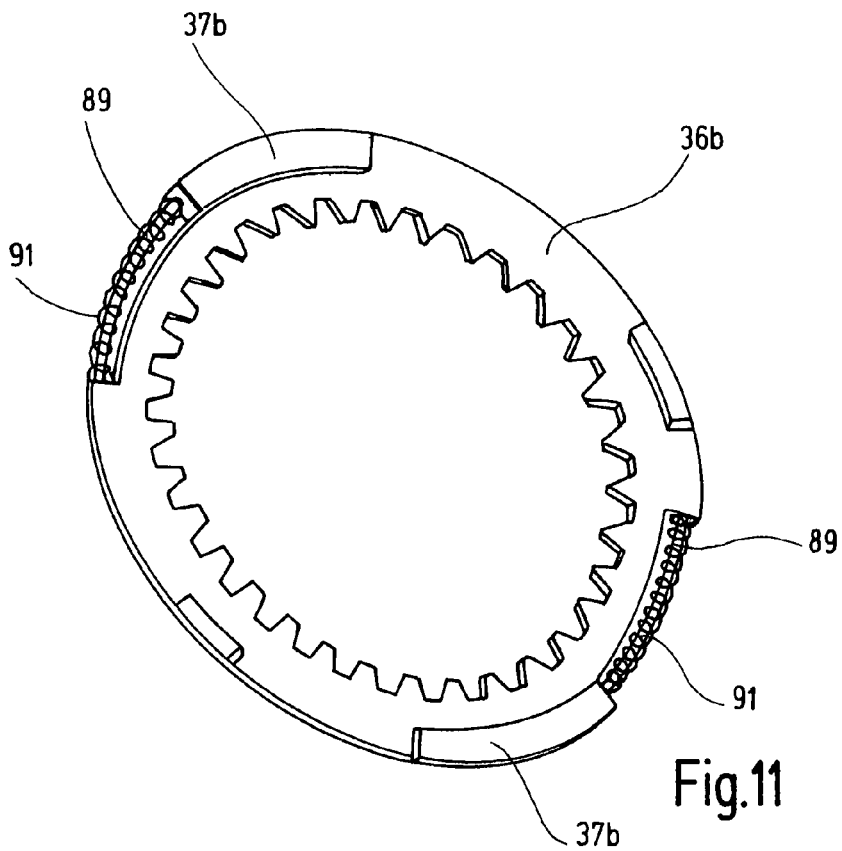
FIG. 11 is a perspective view of a toothed ring according to a fourth modification of the exemplary embodiment.

A third modification is almost fully identical to the exemplary embodiment; therefore, the modified but identically acting components have reference numbers to which a letter has been added. In accordance with the third modification, a toothed ring 36a is provided which is flexible in the axial direction and is made, for example, of spring sheet metal. The toothed ring 36a exhibits first control cams 37a which, as in the exemplary embodiment, are provided in order to cooperatively interact with the lugs 23' on the locking elements 23. The ends of the first control cams 37a located in the circumferential direction each comprise a sloping face 87. If, in the case of misuse, the force between the lugs 23' and the first control cams 37a becomes excessively high due to the direction of the wobble motion of the geared fitting 11, the lugs 23' force the toothed ring 36a away from themselves in the axial direction, via the sloping faces 87, as indicated by an arrow in FIG. 10 (this is possible due to the flexibility of the toothed ring 36a or the flexible design of the first control cams 37a on the toothed ring 36a), so that the lugs 23' end up on the back of the respective first control cam 37a. Damage is avoided in this way, although the stored starting position is lost.

A fourth modification is also almost fully identical to the exemplary embodiment; therefore, the modified but identically acting components have reference numbers to which a letter has been added. In accordance with the fourth modification, a toothed ring 36b is provided whose first control cams 37b are separately formed and are movable relative to the basic body of the toothed ring 36b. These control cams 37b can in each case be moved in a circumferential direction over a certain angular range by means of a cam guide 89, which in the present case consists of a wire curved concentrically relative to the toothed ring 36b and enclosed by the first control cams 37b. A cam spring 91 in each case tensions a first control cam 37b towards one end of the cam guide 89. If, in the case of misuse, the force between the lugs 23' and the first control cams 37b becomes excessive, i.e. greater than the pretensioning of the cam spring 91, the lugs 23' force the first control cams 37b away from themselves in the circumferential direction. The length of the cam guide 89 is matched to the maximum relative movement determined by the wobble motion of the geared fitting 11. As a result, damage is avoided.

It will be understood by those skilled in the art that while the present invention has been discussed above with reference to an exemplary embodiment and modifications thereof, various additions, modifications and changes can be made thereto without departing from the spirit and scope of the invention as set forth in the following claims.

What is claimed is:

1. A compound fitting for a vehicle seat, wherein the compound fitting is adjustable about a first axis, and the compound fitting comprises:
    a fully functional geared fitting for adjusting the compound fitting about the first axis, wherein the geared fitting has a second axis that is parallel to the first axis, and the geared fitting is an eccentric planetary gear system that includes
        first and second fitting parts mounted so that there can be relative rotation between the first and second fitting parts, wherein one of the first and second fitting parts comprises a gear wheel and the other of the first and second fitting parts comprises a gear rim, and
        an eccentric including a rotatably mounted driver and wedge segments configured so that the relative rotation between the first and second fitting parts of the geared fitting occurs in response to rotation of the driver;
    a fully functional detent fitting for adjusting the compound fitting about the first axis, wherein
        the detent fitting includes locking elements, a first fitting part and a second fitting part,
        the first and second fitting parts of the detent fitting are mounted so that there can be relative rotation between the first and second fitting parts of the detent fitting,
        one of the first and second fitting parts of the detent fitting comprises guides for guiding the locking elements into radially outer positions in which the locking elements cooperate with the other of the first and second fitting parts of the detent fitting to lock the detent fitting and thereby restrict relative rotation between the first and second fitting parts of the detent fitting; and
    a connection between the second fitting part of the geared fitting and the second fitting part of the detent fitting for restricting relative rotation between the second fitting part of the geared fitting and the second fitting part of the detent fitting, wherein the geared fitting and the detent fitting are arranged so that
        the geared fitting and the detent fitting are substantially axially aligned with respect to one another along the first axis,
        the second fitting part of the geared fitting is positioned between the first fitting part of the geared fitting and the second fitting part of the detent fitting, and
        the second fitting part of the detent fitting is positioned between the first fitting part of the detent fitting and the second fitting part of the geared fitting.

2. The compound fitting according to claim 1, wherein:
    a control device controls locking of the detent fitting as a function of angular positions of elements with respect to one another, and
    the elements are selected from the group consisting of the first fitting part of the geared fitting, the second fitting part of the geared fitting, the first fitting part of the detent fitting and the second fitting part of the detent fitting.

3. The compound fitting according to claim 2, wherein the control device comprises compensating means for compensating for wobble motion of the geared fitting.

4. The compound fitting according to claim 3, wherein the compensating means comprises a planetary gear system.

5. The compound fitting according to claim 2, wherein the control device comprises a planetary gear system for compensating for wobble motion of the geared fitting.

6. The compound fitting according to claim 2, wherein:
    the control device comprises rings;
    the rings are for cooperating by way of control cams with the locking elements of the detent fitting;
    the control device comprises compensating means for compensating for wobble motion of the geared fitting;
    the compensating means holds a first ring of the rings at a constant angular position relative to the first fitting part of the geared fitting; and
    a second ring of the rings remains at a constant angular position relative to the second fitting part of the geared fitting.

7. The compound fitting according to claim 6, wherein the first ring carries at least one control cam of the control cams in a manner so that the at least one control cam is movable relative to a reference portion of the first ring.

8. The compound fitting according to claim 7, wherein the at least one control cam being movable relative to the reference portion of the first ring comprises:
    the at least one control cam being movably mounted to the first ring.

9. The compound fitting according to claim 7, wherein the at least one control cam is part of the first ring, and the at least one control cam being movable relative to the reference portion of the first ring comprises:
    at least one of the first ring and the at least one control cam being flexible.

10. The compound fitting according to claim 7, wherein the first and second axes extend in an axial direction, and the at least one control cam being movable relative to the reference portion of the first ring comprises:
    the at least one control cam control cam being movable in at least the axial direction relative to the reference portion of the first ring.

11. The compound fitting according to claim 7, wherein the at least one control cam being movable relative to the reference portion of the first ring comprises:
    the at least one control cam being movable in at least a circumferential direction relative to the reference portion of the first ring.

12. The compound fitting according to claim 1, further comprising:
    an extension bushing that is connected to the second fitting part of the geared fitting or the second fitting part of the detent fitting; and
    a dead-center spring, wherein one end of the dead-center spring is connected to the extension bushing, and another end of the dead-center spring is connected to the first fitting part of the detent fitting.

13. The compound fitting according to claim 1, comprising a ring that at least partially encloses and/or at least partially clasps the geared and detent fittings.

14. The compound fitting according to claim 1, wherein:
    the geared fitting comprises at least one structure that at least partially encloses and/or at least partially extends over the geared fitting; and the detent fitting comprises at least one structure that at least partially encloses and/or at least partially extends over the detent fitting.

15. The compound fitting according to claim 14, wherein:
the at least one structure of the geared fitting comprises a first ring; and
the at least one structure of the detent fitting comprises a second ring.

16. The compound fitting according to claim 1 in combination with the vehicle seat, wherein the vehicle seat includes a seat part and a backrest that can be inclined between use positions and is pivotable into at least one non-use position relative to the seat part by way of the compound fitting.

17. The compound fitting according to claim 1, wherein the compound fitting further comprises:
a control device for controlling locking of the detent fitting as a function of angular positions of elements with respect to one another,
wherein said elements are selected from the group consisting of the first fitting part of the geared fitting, the second fitting part of the geared fitting, the first fitting part of the detent fitting and the second fitting part of the detent fitting, and
wherein the control device is further for compensating for wobble motion of the geared fitting.

18. The compound fitting according to claim 17 in combination with the vehicle seat, wherein:
the vehicle seat includes a seat part and a backrest that can be inclined between use positions and is pivotable into at least one non-use position relative to the seat part by way of the compound fitting;
the compound fitting further comprises
(a) an upper fitting part that is mounted to the to the backrest, and
(b) a lower fitting part that is mounted to the seat part;
the upper fitting part is mounted for pivoting with one of the first fitting part of the geared fitting and the first fitting part of the detent fitting; and
the lower fitting part is mounted for pivoting with the other of the first fitting part of the geared fitting and the first fitting part of the detent fitting.

19. The compound fitting according to claim 1, wherein the connection, which is between the second fitting part of the geared fitting and the second fitting part of the detent fitting, comprises a weld.

20. A compound fitting for a vehicle seat, wherein the compound fitting is adjustable about a first axis, and the compound fitting comprises:
a geared fitting for adjusting the compound fitting about the first axis, wherein the geared fitting has a second axis that is parallel to the first axis, and the geared fitting includes a first fitting part and a second fitting part that are mounted so that there can be relative rotation between the first fitting part and the second fitting part; and
a detent fitting for adjusting the compound fitting about the first axis, wherein
the geared fitting and the detent fitting are mounted so that the geared fitting and the detent fitting are substantially axially aligned with respect to one another along the first axis,
the detent fitting comprises a first fitting part and a second fitting part that are mounted so that there can be relative rotation between the first fitting part of the detent fitting and the second fitting part of the detent fitting,
a control device controls locking of the detent fitting as a function of angular positions of elements with respect to one another, the elements are selected from the group consisting of the first fitting part of the geared fitting, the second fitting part of the geared fitting, the first fitting part of the detent fitting and the second fitting part of the detent fitting,
the control device comprises rings, the rings are for cooperating by way of control cams with locking elements of the detent fitting, each of the locking elements of the detent fitting comprises a lug, and the control cams are for cooperating with the lugs of the locking elements of the detent fitting,
the control device comprises compensating means for compensating for wobble motion of the geared fitting, the compensating means holds a first ring of the rings at a constant angular position relative to the first fitting part of the geared fitting, and
a second ring of the rings remains at a constant angular position relative to the second fitting part of the geared fitting.

* * * * *